United States Patent [19]

Kresge

[11] 4,100,588

[45] Jul. 11, 1978

[54] ELECTRICAL OVERVOLTAGE SURGE ARRESTER WITH VARISTOR HEAT TRANSFER AND SINKING MEANS

[75] Inventor: James S. Kresge, Pittsfield, Mass.

[73] Assignee: General Electric Company, N.Y.

[21] Appl. No.: 778,007

[22] Filed: Mar. 16, 1977

[51] Int. Cl.[2] .......... H02H 3/22

[52] U.S. Cl. .......... 361/127; 315/36

[58] Field of Search .......... 361/126, 127, 130, 117, 361/128; 315/36; 313/269, 231.1, 281; 174/35 TS

[56] References Cited

U.S. PATENT DOCUMENTS

| | | | |
|---|---|---|---|
| 2,050,334 | 8/1936 | Kellogg | 361/121 |
| 2,809,004 | 10/1957 | Kaufman et al. | 174/35 TS |
| 2,861,782 | 11/1958 | Swartz | 174/35 TS |
| 3,214,634 | 10/1965 | Osmundsen et al. | 315/36 |
| 3,566,183 | 2/1971 | Olsen et al. | 315/36 |

*Primary Examiner*—Patrick R. Salce

*Attorney, Agent, or Firm*—Francis X. Doye; Richard A. Menelly

[57] ABSTRACT

The arrester comprises an insulating housing with end terminals and a plurality of varistors inside the housing electrically connected between the terminals. The varistors are provided individually or in groups with a heat transfer and sinking collar which is electrically insulating and thermally conducting. The collar may be in thermally conducting contact with the inside wall of the housing to improve heat dissipation to the housing. The configuration of the collar is such that when it is installed in the housing, there is a passageway through it to provide a longitudinal space in the arrester for accommodating arcing and for the venting of gas in the event of an arrester failure.

22 Claims, 15 Drawing Figures

ELECTRICAL OVERVOLTAGE SURGE ARRESTER WITH VARISTOR HEAT TRANSFER AND SINKING MEANS

BACKGROUND OF THE INVENTION

The present invention relates generally to electrical overvoltage surge arresters of the type which include power varistors and relates more particularly, but not exclusively, to such arresters which have no power handling arcing gaps connected in series with the varistors and which have varistors of the zinc oxide type.

Overvoltage surge arresters can be considered to be high speed voltage sensitive switches which are normally in the open position and connected between an electrical system and ground or some other reference potential. Typically, they include an electrical series of one or more varistors and one or more arc gaps in an insulating housing. At higher voltages, there may be voltage grading resistors shunting the gaps and also certain other circuitry to afford better control of the arrester response to a surge.

When the arrester is in the steady state, essentially no current passes through it except for the steady state current through the grading resistors. A voltage surge in the system above a predetermined voltage, however, will cause the arc gaps to arc over and pass a large current to ground through the series power varistors, which are chosen to have a low resistance at such a voltage. As the system voltage returns to normal, the resistance of the power varistors rapidly increases until there is insufficient follow current through the arrester for the arcs to be maintained in the gaps and the arrester then clears to once again become an open switch. The gaps perform the functions of providing a sharp control of the switching function and of isolating the system voltage from the varistors in the steady state. This isolating is needed because the varistors may not have sufficient nonlinearity in their current-voltage characteristic for keeping the steady state current at the normal system voltage to a low enough value to prevent thermal damage to the arrester.

Recently developed varistors of the zinc oxide compound type have made it feasible to eliminate series arc gaps entirely from arresters. These varistors are often referred to as "high exponent" varistors. The "exponent" is the numerical exponent in the current-voltage relationship $I = KV^n$ for a varistor, where I is the current through the varistor, K is a constant, and V is the voltage across the varistor. Such high exponent varistors can have sufficient resistance at system voltage to pass a follow current which is not ordinarily significant, while nevertheless having a sufficiently rapid decreasing of resistance at predetermined surge voltages to afford close control of the arrester switching functions without any interposed gaps.

Varistors used in arresters are generally subject to a thermal runaway condition, and this is particularly true for high exponent varistors used without series arc gaps. The runaway condition is due to the tendency of the varistor at a set voltage to pass more and more current with increasing temperature.

An arrester without series gaps and with high exponent power varistors will pass a certain steady state current at the normal system voltage. The magnitude of this current will be affected by the manner in which heat generated by the current is dissipated from the arrester. If the steady state current is too high, then the temperature of the arrester will continue to rise and the current will increase until the arrester fails, since the temperature dependence of the varistor current is a higher order function than is the heat dissipation from the arrester. On the other hand, even if the steady-state current is well below the instability threshold, a series of surge currents might add so much energy to the varistors that they are unable to recover to the steady-state current and are thus pushed into a runaway condition.

The problem of thermal runaway in arresters has been recognized previously. Prior approaches to preventing runaway have concerned primarily improving the heat transfer between the varistors and the housing, so that the housing would dissipate enough heat to keep the varistors well below a temperature from which they might be pushed into runaway by any normally anticipated surge currents. Such a prior approach is described, for example, in U.S. Pat. No. 2,050,334 issued Aug. 11, 1936 to D. R. Kellogg. In Kellogg there is disclosed an arrester in which the space between the varistors and the porcelain housing is filled with a nonflammable insulator to improve the heat transfer to the housing. The insulator is cylindrical and is provided after the varistors have been fitted into the housing. Depending on the particular insulator form, it may be packed around varistors, embed them, or be inserted as a preformed cylinder.

A serious problem with the above prior approach is that any arcing across the varistors in a failure mode will be closely confined and will therefore result in a rapid generation of large volumes of gas. Such gas generation presents an increased liklihood of a violent explosion of the housing.

SUMMARY OF THE INVENTION

The novel arrester of the present invention comprises between the varistors and the housing a heat transfer and sinking collar. The collar configuration is such as to leave space for free arcing in the event of a failure of the varistors. This reduces the rapid generation of gases which would result from a confined arc and thereby substantially reduces the liklihood of a violent failure of the arrester. In addition to its function of transferring heat from the varistors to the housing, the collar itself acts as a heat sink to supplement the heat capacity of the varistors and to thereby decrease the liklihood of the varistors being pushed into a thermal runaway condition by impulse energy.

DESCRIPTION OF THE PREFERRED EMBODIMENTS

EXAMPLE 1

Figure 1:
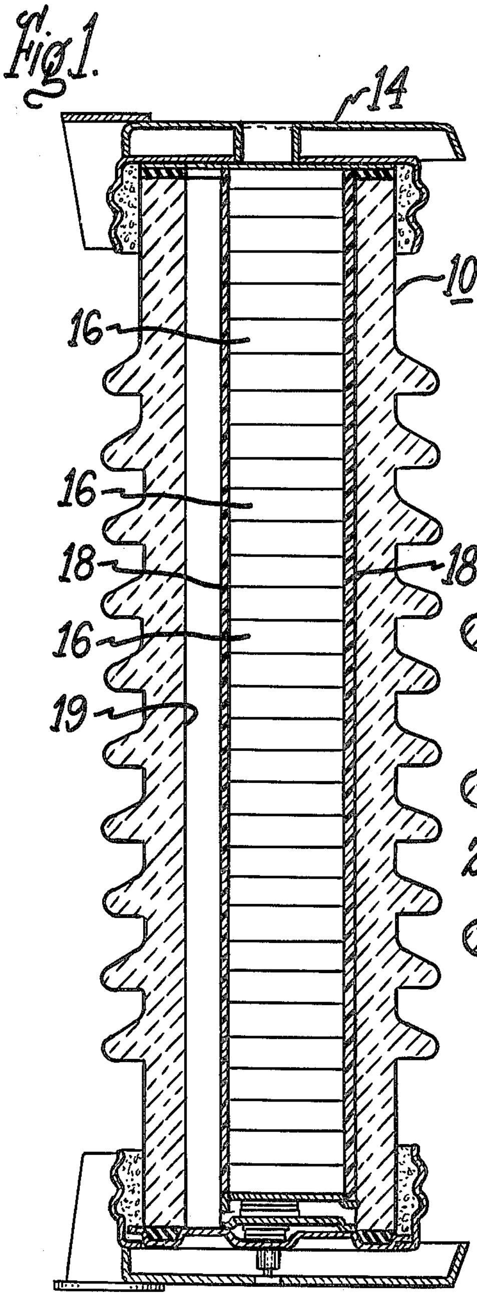
FIG. 1 is a side sectional view of a first example of an arrester in accordance with a preferred embodiment of the present invention.

A first preferred embodiment of the present invention is the electrical overvoltage surge arrester 10 shown in FIG. 1 of the drawings. The arrester 10 has a housing which includes a skirted housing porcelain 12. The porcelain 12 has fixed to its ends two metal terminal end cap assemblies 14 which include means for venting of gas from inside the arrester 10 when a predetermined gas pressure is exceeded in the arrester. Inside the porcelain 12 and electrically connected in series between the end cap assemblies 14 is a stack of discoid-shaped varistors 16 which are of high exponent zinc oxide compound ceramic material. The varistors 16 are disposed to one side of the central axis of the porcelain 12.

Filling a major portion of the longitudinal space between the varistors 16 and the interior wall of the porcelain 12 is a heat transfer and sinking material 18 which is a room-temperature-vulcanizing silicone rubber compound loaded with a particulate aluminum oxide filler. The unfilled portion of the longitudinal space in the interior of the porcelain 12 defines an arcing and gas venting channel 19.

Figure 2:
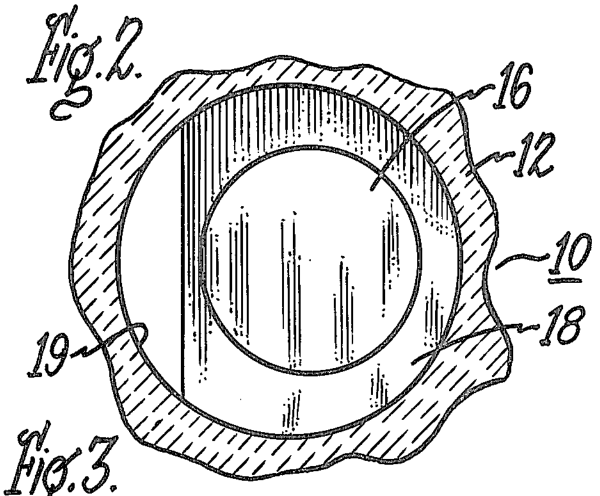
FIG. 2 is a cross-sectional view of the arrester of FIG. 1 taken through the central portion.

In FIG. 2 is shown a cross-section through the arrester 10 illustrating one of the varistors 16 embedded in the heat transfer and sinking material 18. Each of the varistors 16 is provided on its faces with a conductive electrode coating, so that when the varistors 16 are stacked together, they are connected electrically in series by the contact between the adjacent faces.

The heat transfer material 18 may be poured into the arrester 10 after the varistors 16 are installed, and the arrester 10 then turned on its side during the curing of the material 18 so that by self-leveling of the material 18 the venting channel 19 is left in the interior of the porcelain 12.

The heat transfer and sinking material 18 provides an improved thermal coupling between the varistors 16 and the porcelain 12 to permit more effective dissipation of heat generated in the varistors 16 from the porcelain during the steady state operation of the arrester 10 on a system. It also augments the heat sinking capability for the varistors 16 by adding to the total heat capacity of the arrester 10 so that the varistors 16 are less subject to being pushed into a thermal runaway condition by the energy absorbed during the course of a single long over-voltage impulse or by a series of impulses closely spaced in time. A further function of the heat transfer and sinking material 18 is the protection of the varistors 16 against mechanical shock damage during shipment or other handling of the arrester 10.

For all the embodiments described herein, a suitable heat transfer and sinking material may be made by mixing 1.8 parts by weight aluminum oxide sand particulate filler with 1 part low-viscosity two-component room-temperature-vulcanizing liquid silicone rubber binder, such as for example a product marketed in 1976 as RTV 627 by the Silicone Products Department of the General Electric Company, Waterford, N.Y., U.S.A. The sand is preferably a mixture of equal parts 180 grit fine and 80 grit coarse as defined by the U.S. National Bureau of Standards for example in U.S. Dept. of Commerce publication 118–50, "Simplified Practice Recommendations." The primary function of the coarse component of the sand is to improve the thermal conductivity, while the primary functions of the fine component of the sand are to improve the structural properties of the material, to inhibit settling out of the coarse component during pouring and curing, and to displace the more costly silicone rubber binder.

The venting channel 19 provides a space for unconfined arcing across any or all the varistors 16 in case of a failure of the arrester 10, so that a minimum of gas is generated by the failure. The gas that is unavoidably generated in such a failure can be vented through the venting mechanisms in the end cap assemblies 14 by passing through the unrestricted venting channel 19 left by the heat transfer material 18.

EXAMPLE 2

Figure 3:
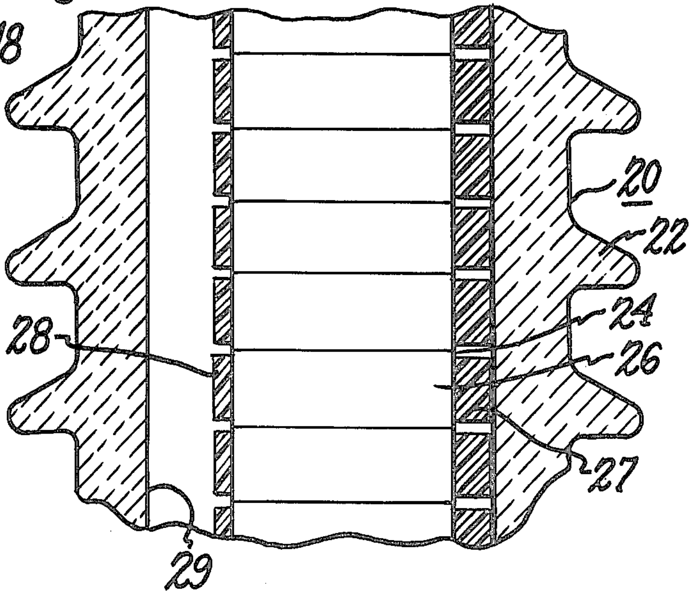
FIG. 3 is a side sectional view of a longitudinal fragment of an arrester of a second example in accordance with a preferred embodiment of the present invention.

A second preferred embodiment of the present invention is the arrester 20 shown in the FIG. 3 of the drawings. The housing of the arrester 20 includes cap assemblies and a porcelain 22 and is similar to that of the arrester 10 of Example 1. Stacked inside the housing porcelain 22 of the arrester 20 are a plurality of varistor units 24, one of which is shown in more detail in the FIG. 4. There is left by the varistor units 24 a venting space 29 which extends longitudinally along the interior arrester 20.

Figure 4:
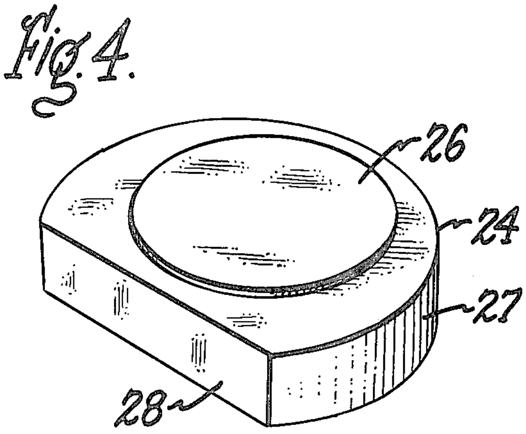
FIG. 4 is an elevational view of one of the varistor units of the arrester of FIG. 3.

The varistor unit 24 of FIG. 4 is a zinc oxide compound varistor 26 which is provided with an individual heat transfer and sinking collar 27 of heat transfer material of the same type as the material 18 of the arrester 10 in Example 1. The collar 27 completely surrounds the varistor 26 and has a flattened venting space section 28 which provides the incremental portion of the venting space 25 of the arrester 20 for the individual varistor unit 24.

There are several advantages to the combining of a varistor and an individual heat transfer and sinking collar 27, rather than an arrangement such as in the arrester 10 of Example 1, where the material 18 encapsulates all the varistors 16 as a group. One advantage is that the individually collared varistor units 24 are easier to handle and to install in the arrester than are the varistors 26 themselves without the collar 27, since the collar 27 provides a supporting means for the varistors 26. Another advantage is that the varistor units 24 can be readily disassembled again if upon testing of the finished arrester 20 it is found that one or more of the varistors 26 is faulty. A faulty one of the varistor units 24 can then be replaced and the arrester reassembled without being scrapped. A third advantage to combining the varistors 26 individually with a collar 27 to make a unit 24 is that the configuration of the collar 27 can be readily modified to save material and to be better adapted for other problem conditions.

One characteristic that can be a problem is the difference in the coefficient of thermal expansion between the material of the collar 27 and the varistors 26 and porcelain 22. The coefficient of thermal expansion of the collar 27 is considerably greater than that of the porcelain 22 or the varistor 26. This could mean that upon heating of the arrester 20 the collar 27 of adjacent varistor units 24 would push against each other so that the contact between the faces of their respective varistors 26 is broken. In order to prevent such an occurrence, the thickness of the collar 27 is made less than the thickness of the varistor 26.

It is desirable that each of the varistor units 24 be firmly held in place within the porcelain 22, both for simple mechanical stability and also for establishing a good heat transfer relationship to the porcelain 22. Since the material of the collar 27 can be made resilient, the collar 27 can itself provide the mechanical and thermal contact needed to establish the desired holding in place. However, it is found that as the thermal conductivity of the collar 27 is increased by increased loading with insulating ceramic particulates such as aluminum oxide, the resilience decreases to the point where excessive stresses may result in the course of installation of the units 24 and also upon heating of the arrester 20 after it is completed.

There are described below several alternative configurations of varistor units with collars modified to avoid one or more of the above problem conditions. The alternative units are of the same general type as the varistor units 24 of the arrester 20 in that the units include a separate and individual heat sinking and transfer collar and may be incorporated into an arrester porcelain in one or more stacks. Therefore, the features of the arrester other than the porcelain are not further discussed for each alternative unit. Also, the collar of each alternative unit may be of the same material as described for the arrester 10 of Example 1 above.

Figure 5:
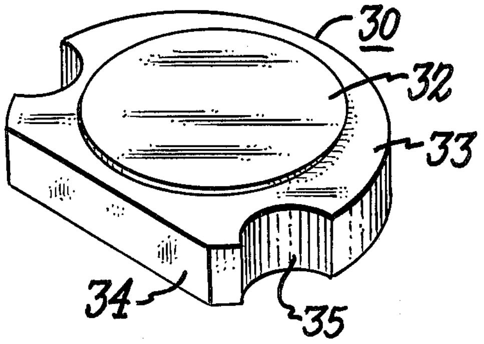
FIG. 5 is an elevational view of a first alternate configuration for a varistor unit of the general type as the unit of FIG. 4.
Figure 7:
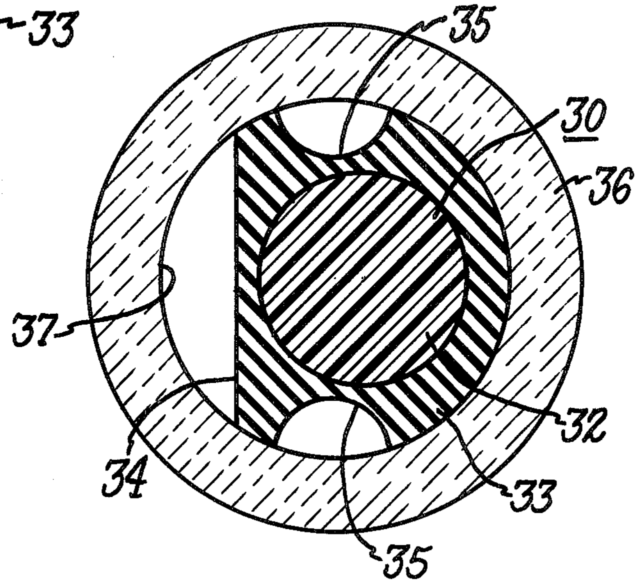
FIG. 7 is a cross-sectional view of an arrester with varistor units such as the unit shown in FIG. 5.
Figure 6:
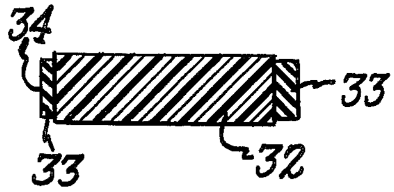
FIG. 6 is a front sectional view of the varistor unit of FIG. 5.

In the FIGS. 5 and 6 there is shown a first alternative varistor unit 30. The varistor unit 30 includes a varistor 32 and a collar 33 around the varistor 32. The collar 33 has a flattened venting space section 34 and is provided with two expansion space indents 35. The indents 35 compensate for a loss of resiliency in the collar material when it is heavily loaded with filler. The varistor unit 30 is shown installed in a porcelain 36 in the FIG. 7 with a venting space 37 left open. The indents 35 save collar material and provide a space for the collar 33 to expand. Also, the indents 35 make those portions of the collar 33 which are to either side of the venting space section 34 flexible, to permit a snug fit in porcelains of various diameters. The faces of the varistor 32 are raised above the collar 33 to allow for thermal expansion of the collar 33 in that direction.

Figure 8:
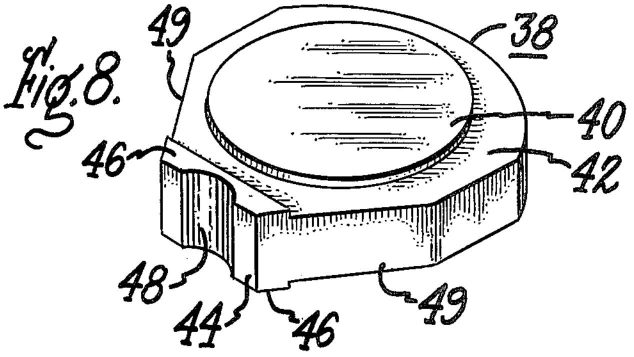
FIG. 8 is an elevational view of a second alternative configuration for a varistor unit of the general type as the unit of FIG. 4.
Figure 9:
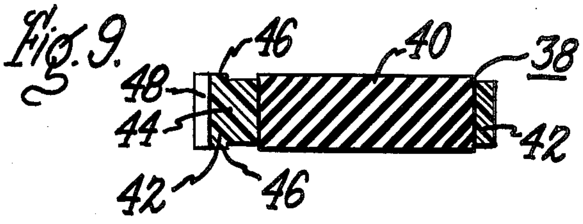
FIG. 9 is a side sectional view of the varistor unit of FIG. 8.
Figure 10:
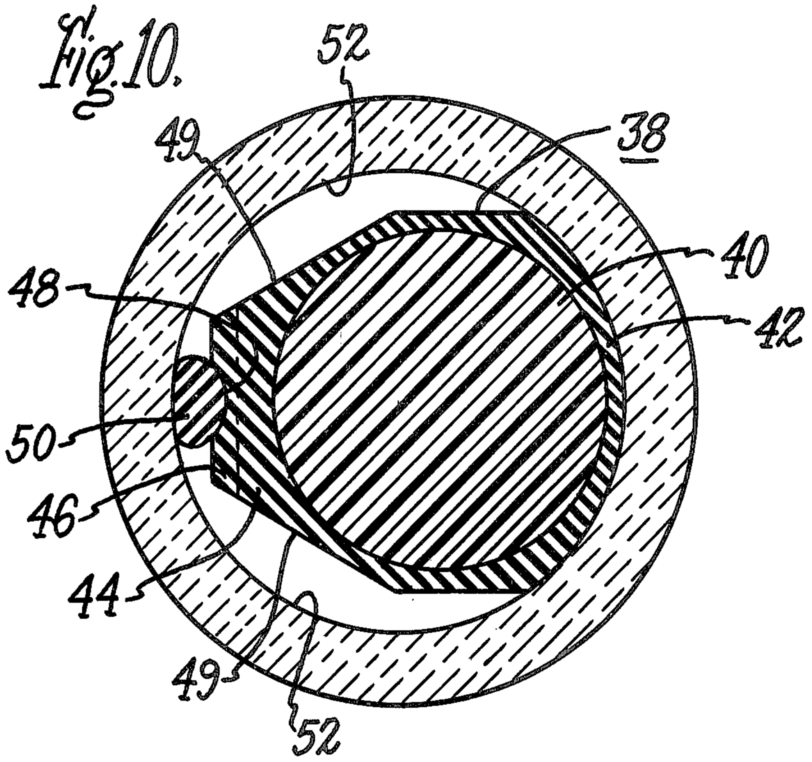
FIG. 10 is a cross-sectional view of an arrester in which varistor units such as the unit of FIGS. 8 and 9 are installed and held in place by a resilient biasing ball.
Figure 11:
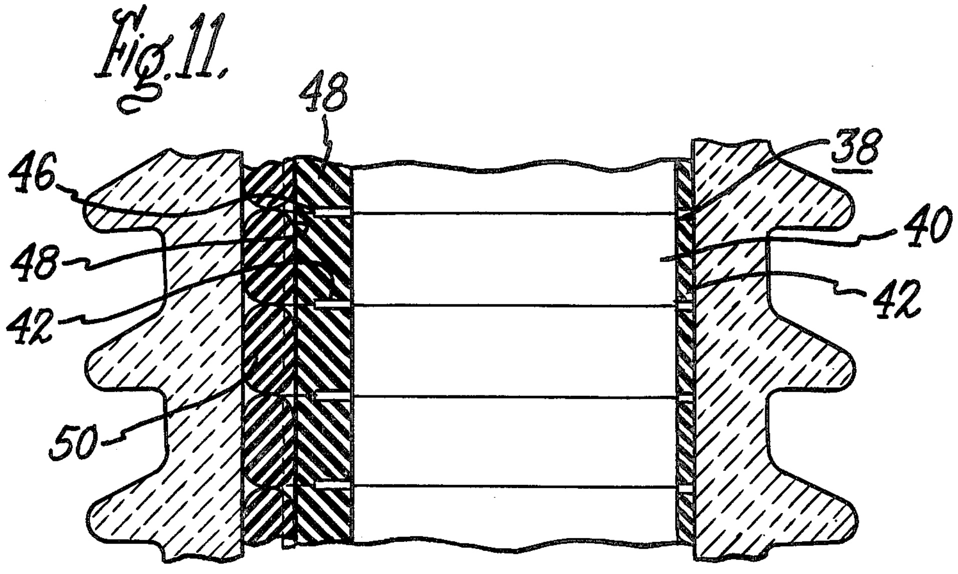
FIG. 11 is a side sectional view of a longitudinal fragment of the arrester.

In the FIGS. 8 and 9 there is shown a second alternative varistor unit 38 which is adapted to be installed inside the porcelain 36 as is shown in the FIGS. 10 and 11. The unit 38 includes a varistor 40 and a collar 42. The faces of the varistor 40 are raised above the collar 42 to permit expansion of the collar 42. The collar 42 includes a nose 44 which has a raised portion 46 and a longitudinal bias channel 48. Four faceted portions 49 of the collar 42 function as vent space sections 49. As shown in the FIGS. 10 and 11, the varistor unit 38 is installed in the porcelain 36 together with a highly resilient bias ball 50, which is cast of unfilled silicone rubber. The ball 50 is pushed into place between the bias channel 48 of the varistor unit 38 and the inside wall of the porcelain 36, and is just large enough in diameter to be slightly deformed when in place, so that it exerts a constant bias on the varistor unit 38 against the opposite inside wall of the porcelain 36. This provides mechanical stability and a good thermal contact of the varistor unit 38 to the porcelain 36 by forcing the collar 42 to conform to the wall of the porcelain 36. The vent space sections 49 provide for venting on both sides of the nose 44, so that there are two venting spaces 52 formed in an arrester with units such as the varistor units 38. The raised portion 46 of the nose 44 retains the proper spacing of the nose 44 when the varistor unit 38 is in a stack and biased by the ball 50. The part of the nose 44 near the end and including the channel 48 may have additional loading of particulate filler material to further stiffen it, so that the force of the bias ball 50 is more evenly distributed in the collar 42.

The bias balls 50 hold the varistor units 38 individually in a stack inside a porcelain. The balls 50 can be readily pushed along the aligned bias channels 48 of the varistor units 38, one at a time, or even in groups, and also be readily pulled out to release the varistor units 38. The longitudinal dimension of the installed balls 50 is the same as the thickness of the varistors 40 of the units 38, so that the balls 50 of a stack of the units 38 are necessarily in registry with the stacked varistor units 38.

The use of a bias ball for holding in place a varistor unit is not a part of the present invention, and is separately disclosed and claimed in the application Ser. No. 778,006 filed Mar. 16, 1977 in the name of E. W. Stetson and entitled OVERVOLTAGE SURGE ARRESTER HAVING LATERALLY BIASED RESILIENTLY CARRIED VARISTORS.

Figure 12:
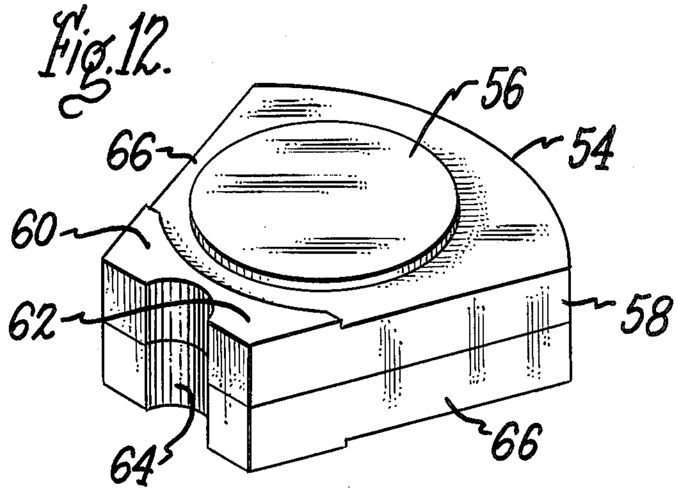
FIG. 12 is an elevational view of a third alternative configuration for a varistor unit of the general type as the unit of FIG. 4.
Figure 13:
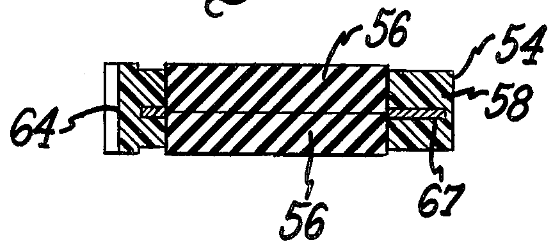
FIG. 13 is a front sectional view of the varistor unit of FIG. 12.
Figure 14:
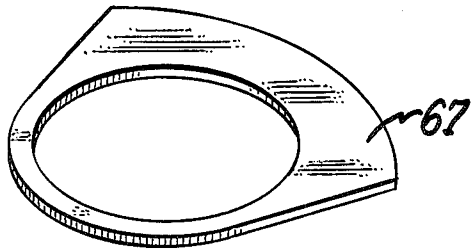
FIG. 14 is an elevational view of a metal thermal shunt plate which is included in the varistor unit of FIGS. 12 and 13.

In the FIGS. 12 and 13 there is shown a third alternative varistor unit 54 which includes a pair of varistors 56 stacked together and surrounded by a single collar 58. The collar 58 has a nose 60 with a raised portion 62 and a bias channel 64 much as does the varistor unit 38 described above. Two flat vent space sections 66 of the collar 58 are located to each side of the nose 60. In addition, there is embedded in the mid-section of the collar 58 an aluminum thermal shunt plate 67, shown separately in the FIG. 14 for increasing the thermal conductivity laterally in the collar 58.

Figure 15:
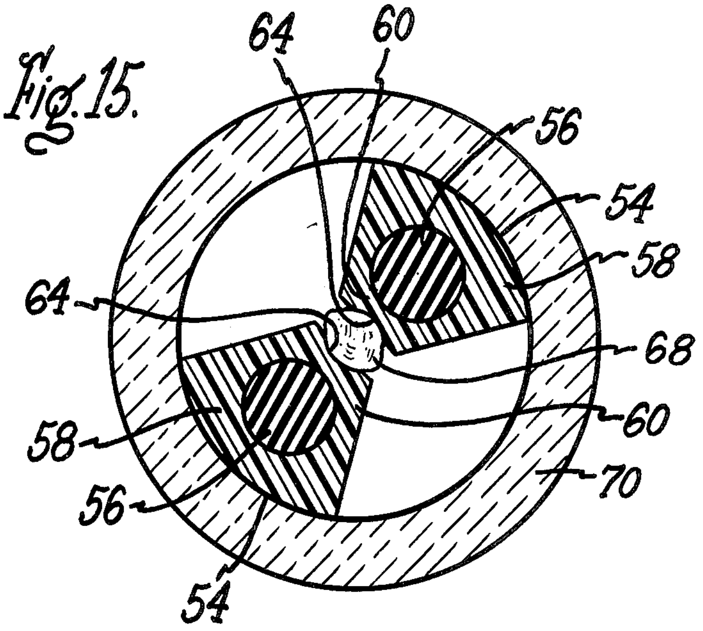
FIG. 15 is a cross-sectional view of an arrester showing a pair of varistor units such as the unit of FIGS. 12 and 13 installed in the porcelain held in place by a resilient biasing ball.

In the FIG. 15 there is shown how a plurality of the varistor units 54 are installed and held in place by bias balls 68 in an arrester porcelain 70. There are two parallel stacks of the varistor units 54 oriented in diametrically opposed relationship in the porcelain 70. The bias ball 68 between them and in both channels 64 provides a mutually opposing force to the nose 60 to firmly hold the units 54 in place and in intimate contact with the inside wall of the porcelain 70. Such an arrangement of parallel stacks of the varistor units 54 is particularly suited for arresters designed to withstand unusually high surge currents. The handling of such high surge currents requires in some cases that more than one stack of varistors be in parallel to present a current path of sufficiently low resistance. In addition, at high currents the surge voltage across the individual varistor units 54 can be so high that additional insulating surface is needed between the faces to prevent flashover. For this reason, the varistors 56 of the units 54 are not closely spaced from that portion of the collar 58 which is in contact with the porcelain 70, although a close spacing would provide the better thermal coupling of the varistors 56 to the porcelain 70. Instead, the varistors 56 are moved away a sufficient distance to provide the needed insulation surface. Because the thermal coupling to the porcelain 70 is thereby decreased, the thermal shunt plate 67 is embedded in each of the varistor units 54 to correspondingly increase the thermal conductivity of the collar 58 in the general direction of the inside wall of the porcelain 70.

GENERAL CONSIDERATIONS

Varistor units such as described in the preferred embodiments may be used inside a metal enclosure of a gas-insulated system directly in the insulating gas, with sufficient spacing from the enclosure wall, to prevent flashover. With such an arrangement, the insulating housing can be considered to be the gas itself. The collars of the varistor units will be in intimate contact with the gas to provide cooling of the collar by the gas. Independently of the cooling, the collar will provide a heat sinking function for absorbing impulse energy to prevent thermal runaway of the varistors. Thus, the term "insulating housing" as used herein is intended to include an insulating fluid environment in thermal contact with the collars of the varistor units.

The collar of the varistor units may be of any material which is electrically insulating and sufficiently thermally conductive to give improved heat conduction over that normally due to the radiation and convection of the gas inside an arrester. These properties alone will provide heat sinking. Further, it preferably has some resiliency, so that intimate thermal contact can be made to the inside wall of the porcelain by having the material conform to the contours there, and so that differences in the coefficients of thermal expansion of the varistor and the collar are safely absorbed by the elasticity of the material. The filled RTV of the preferred embodiments is particularly suitable as a collar material. However, other elastomers could be used if they have a high enough long-term high-voltage electrical resistance. Also, other particulate fillers, such as silicon or magnesium oxides, etc., can be used, but aluminum oxide has the desired electrical and thermal properties and is readily available.

A single varistor unit may have any number of varistor elements, depending upon the convenience of manufacturing and assembly, and taking into consideration the desired electrical and thermal factors for the particular application.

The collar of a varistor unit need not extend about the entire perimeter of the varistor, but should extend about the portion which is to make contact with the porcelain or housing wall to cushion against mechanical shocks and to provide the thermal contact to the wall by conforming to the contours.

The venting portion of the collar may be of any configuration which is a sufficient departure from the cross-sectional geometry of the interior of the housing to allow for ready passage of gas longitudinally in the housing and to provide an arcing space. The venting portions may, for example, be simply holes punched through the collar in various places to provide passages from one side to the other. However, the venting portions should be made so that they are in registry when the varistor units are stacked.

While for the arresters of the preferred embodiments the varistor units were arranged in mechanical series stacks in which adjacent units were also connected electrically in series with one another, the electrical circuit relationship of units in mechanical series may be varied in numerous ways by interposing between adjacent varistor units an insulating spacer and providing conductive connectors between selected locations of mechanically parallel stacks of units or between locations of the same stack to achieve various other circuit connections as desired. Thus, the present invention is not limited by any particular circuitry of the internal components of the arrester, but relates primarily to the relationship of the varistors to the collar as a heat conducting and sinking means; to the relationship the varistors to the collar as an electrical insulator, and to the relationship of the varistors to the rigid housing of an arrester for thermal contact and mechanical stability.

While the collars as described herein are primarily designed for varistors, it is recognized that their electrical, thermal, and mechanical features may also make them useful for other electrical circuit components which might be included in an arrester circuit. The collars are also clearly applicable to other varistors than those of zinc oxide varistor compound.

I claim:

1. An electrical overvoltage surge arrester, comprising:

a hollow, insulating housing including electrical terminals;

at least one varistor unit containing at least one varistor, said unit being disposed in said housing and electrically connected in series with two of said terminals;

an individual collar of resilient, electrically insulating, thermally conducting material encircling the unit about at least a portion of the perimeter of said unit, said collar being in direct thermally conducting contact with said varistor and with the inside wall of said housing, said collar including a venting portion which is spaced from said wall to define a venting passageway connecting portions of the interior of said housing to either end of said housing.

2. The arrester of claim 1 wherein said collar extends entirely about the perimeter of said unit.

3. The arrester of claim 2 wherein a portion of the outer perimeter of said collar has a configuration which substantially matches the configuration of said wall to provide a matching thermal contact surface for engagement against a corresponding surface of said wall.

4. The arrester of claim 3 wherein said unit is located nearer said matching contact surface than to other portions of said outer perimeter.

5. The arrester of claim 3 wherein said unit has the geometry of a major segment of a round discoid, said collar having a thickness no greater than the thickness of said varistor.

6. The arrester of claim 5 wherein the thickness of said collar is less than the thickness of said varistor, to permit thermal expansion of said collar without said collar extending beyond the exposed surface of said varistor.

7. The arrester of claim 1 wherein said varistor is a circular discoid with a perimeter and two opposing faces, said varistor being surrounded by said collar with the faces exposed.

8. The arrester of claim 7 wherein said faces are raised above said collar to allow for thermal expansion of said collar.

9. The arrester of claim 8 wherein said collar has the general configuration of a discoid from which an inner portion corresponding to the perimeter configuration of said varistor is replaced by said varistor and from which at least one lateral section has been removed to provide said venting portion.

10. The arrester of claim 9 wherein said collar has a perimeter portion with a curvature substantially matching the curvature of said housing wall when said collar is resiliently pressed against said housing wall.

11. The arrester of claim 10 and wherein said collar includes indented portions in the perimeter to accommodate thermal expansion.

12. The arrester of claim 11 wherein said collar material is a room-temperature-vulcanizing silicone rubber filled with a granular electrically insulating, thermally conducting filler.

13. The arrester of claim 12 wherein said filler includes both fine and coarse particles.

14. The arrester of claim 13 wherein said filler is an oxide of silicon or aluminum.

15. An electrical overvoltage surge arrester, comprising:

an elongated, tubular insulating housing closed at both ends by conducting terminal caps;

a plurality of varistor discoids having opposing contact faces and insulating peripheral surfaces stacked longitudinally inside said housing with their respective faces in electrically conducting contact, and a collar of electrically insulating, thermally conducting resilient material filling the space between a portion of the periphery of said varistors and the inside wall of said housing opposite that portion, while leaving unfilled a space between remaining portions of the periphery of said varistors and the inside wall of said housing opposite said remaining portion.

16. The arrester of claim 5 wherein said unfilled space left by said collar includes a passageway extending longitudinally through said collar to provide an arcing and gas venting space within said housing.

17. The arrester of claim 16 wherein said collar is molded to fit individually a subgroup of one or more varistors less in number than the total number of said plurality of varistors and wherein a peripheral surface of said collar is mechanically biased against the inside housing wall to provide a thermally conducting contact thereto.

18. The arrester of claim 17 wherein said collar is of rubber filled with electrically insulating, thermally conducting granules.

19. The arrester of claim 18 wherein said granules are an oxide of silicon or aluminum.

20. The arrester of claim 19 wherein said granules are a mixture of coarse and fine granules.

21. The arrester of claim 20 wherein said rubber is silicone rubber.

22. The arrester of claim 21 wherein said collar contains said granules to the extent of about three times the weight of said rubber.

* * * * *